(12) United States Patent
Hu et al.

(10) Patent No.: US 11,314,033 B2
(45) Date of Patent: Apr. 26, 2022

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Liang-Ting Ho, Taoyuan (TW); You-Zhen Lin, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 164 days.

(21) Appl. No.: 16/799,051

(22) Filed: Feb. 24, 2020

(65) Prior Publication Data

US 2020/0333554 A1 Oct. 22, 2020

(30) Foreign Application Priority Data

Apr. 16, 2019 (CN) .......................... 201920515739.4

(51) Int. Cl.
*G02B 7/02* (2021.01)
*G02B 7/09* (2021.01)
*G02B 27/64* (2006.01)

(52) U.S. Cl.
CPC .................. *G02B 7/02* (2013.01); *G02B 7/09* (2013.01); *G02B 27/646* (2013.01)

(58) Field of Classification Search
CPC .......... G02B 7/02; G02B 7/09; G02B 27/646; G02B 7/04; G02B 26/0841; G02B 26/105; G02B 26/085; G02B 26/0858; G02B 26/0833; G02B 26/101; B81B 3/0083; B81B 3/0086; B81B 2201/04; B81B 2203/04; G03B 2205/0069; G03B 2205/0015; H04N 5/2253; H04N 5/2254; H04N 5/2257

See application file for complete search history.

(56) References Cited

U.S. PATENT DOCUMENTS

2019/0227256 A1* 7/2019 Kuo .................... G06T 7/521

* cited by examiner

*Primary Examiner* — Darryl J Collins
*Assistant Examiner* — Tamara Y. Washington
(74) *Attorney, Agent, or Firm* — Muncy, Geissler, Olds & Lowe, P.C.

(57) ABSTRACT

An optical element driving mechanism is provided. The optical element driving mechanism includes a fixed portion, a movable portion, a driving assembly, and a circuit unit. The movable portion is movably connected to the fixed portion, and holds an optical element. The driving assembly drives the movable portion to move relative to the fixed portion. The circuit unit includes a base, a plate-connecting portion, and a layer-connecting portion. The plate-connecting portion is partially embedded in the base. The layer-connecting portion is disposed on the base. The driving assembly is electrically connected to the layer-connecting portion. The thickness of the plate-connecting portion is different from the thickness of the layer-connecting portion.

19 Claims, 9 Drawing Sheets

OPTICAL ELEMENT DRIVING MECHANISM

CROSS REFERENCE TO RELATED APPLICATIONS

This application claims priority of China Patent Application No. 201920515739.4, filed Apr. 16, 2019, the entirety of which is incorporated by reference herein.

BACKGROUND

Technical Field

The disclosure relates in general to an optical element driving mechanism, and in particular to an optical element driving mechanism including a circuit unit that has a plate-connecting portion and a layer-connecting portion, wherein the plate-connecting portion and the layer-connecting portion have different thicknesses.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choice.

Electronic devices with a camera or video function are usually equipped with a lens driving module to drive a lens to move along the optical axis. Therefore, an autofocus (AF) and/or optical image stabilization (OIS) function is achieved. Light may pass through the lens and form an image on a photosensitive element. However, the miniaturization of the electronic devices has become a mainstay of consumer demand, and the thickness of the electronic device usually depends on the thickness of the lens driving module. Therefore, reducing the thickness of the lens driving module has become an important topic.

BRIEF SUMMARY

The present disclosure provides an optical element driving mechanism. The optical element driving mechanism includes a fixed portion, a movable portion, a driving assembly, and a circuit unit. The movable portion is movably connected to the fixed portion, and holds an optical element. The driving assembly drives the movable portion to move relative to the fixed portion. The circuit unit includes a base, a plate-connecting portion, and a layer-connecting portion. The plate-connecting portion is partially embedded in the base. The layer-connecting portion is disposed on the base. The driving assembly is electrically connected to the layer-connecting portion. The thickness of the plate-connecting portion is different from the thickness of the layer-connecting portion.

In an embodiment, the driving assembly is electrically connected to the plate-connecting portion. In an embodiment, the base has a first surface and a second surface, the layer-connecting portion is disposed on the first surface and the second surface, and the first surface and the second surface are located on different planes. In an embodiment, the base has a first portion and a second portion, the plate-connecting portion is disposed in the first portion, and the thickness of the first portion is greater than the thickness of the second portion. In an embodiment, the plate-connecting portion is electrically isolated from the layer-connecting portion. In an embodiment, the fixed portion further includes a housing, and the plate-connecting portion is affixed to the housing.

In an embodiment, the optical element driving mechanism further includes an electric component, wherein the plate-connecting portion is electrically connected to the electric component. In an embodiment, the driving assembly further includes a magnetic element, and the magnetic element overlaps the plate-connecting portion. In an embodiment, the plate-connecting portion is partially exposed from the base and extends out of the base. In an embodiment, the plate-connecting portion abuts an image-sensing element, and the image-sensing element detects light passing through the optical element.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical element driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
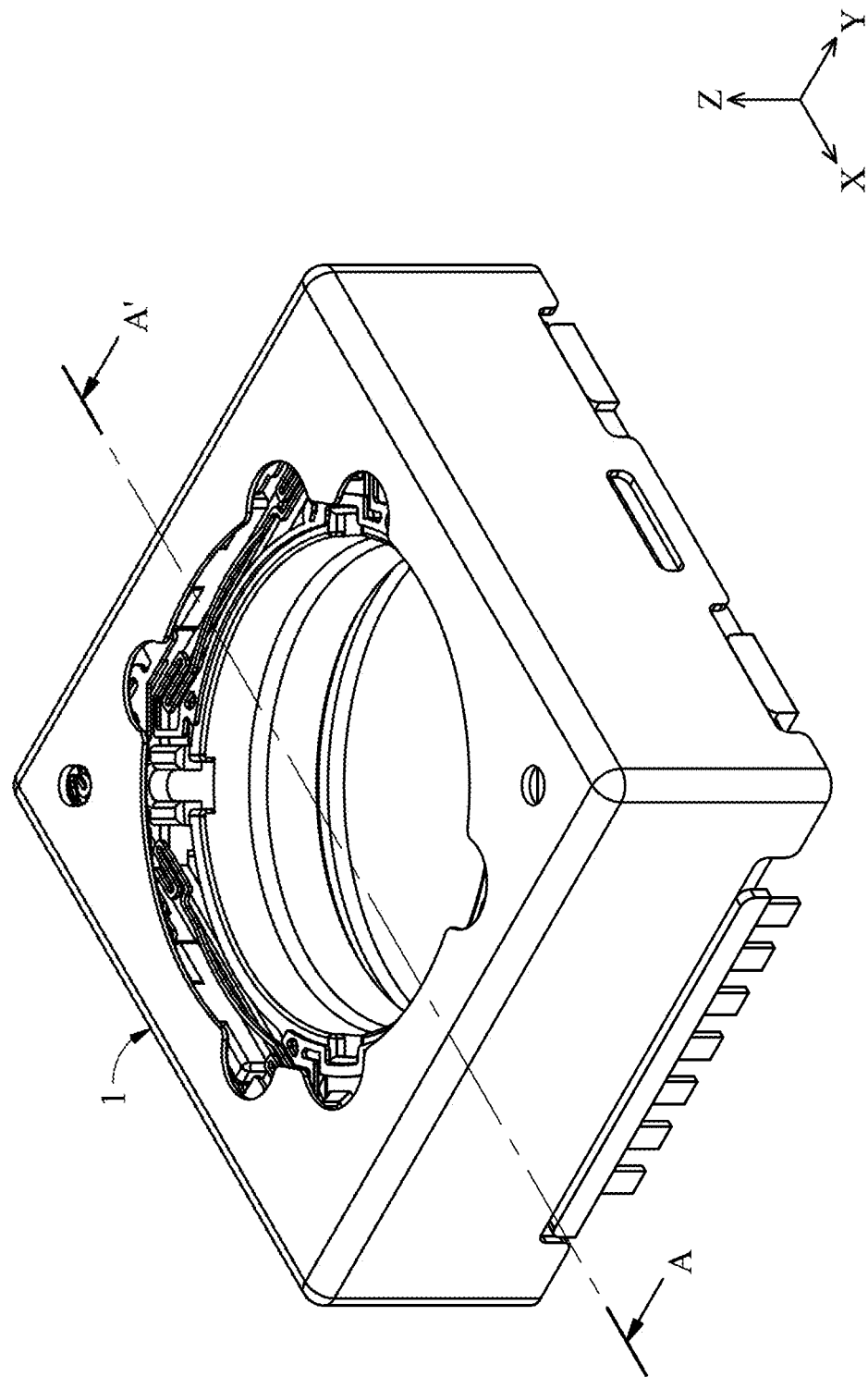
FIG. 1 is a perspective view illustrating an optical element driving mechanism in accordance with an embodiment of the present disclosure.

FIG. 1 is a schematic perspective view illustrating an optical element driving mechanism 1 in accordance with an embodiment of the present disclosure. It should be noted that, in this embodiment, the optical element driving mechanism 1 may be, for example, a voice coil motor (VCM), which may be disposed in the electronic devices with camera function for driving an optical element (such as a lens), and can perform an autofocus (AF) and optical image stabilization (OIS) function. As shown in FIG. 1, the optical element driving mechanism 1 has a substantial rectangular structure.

Figure 2:
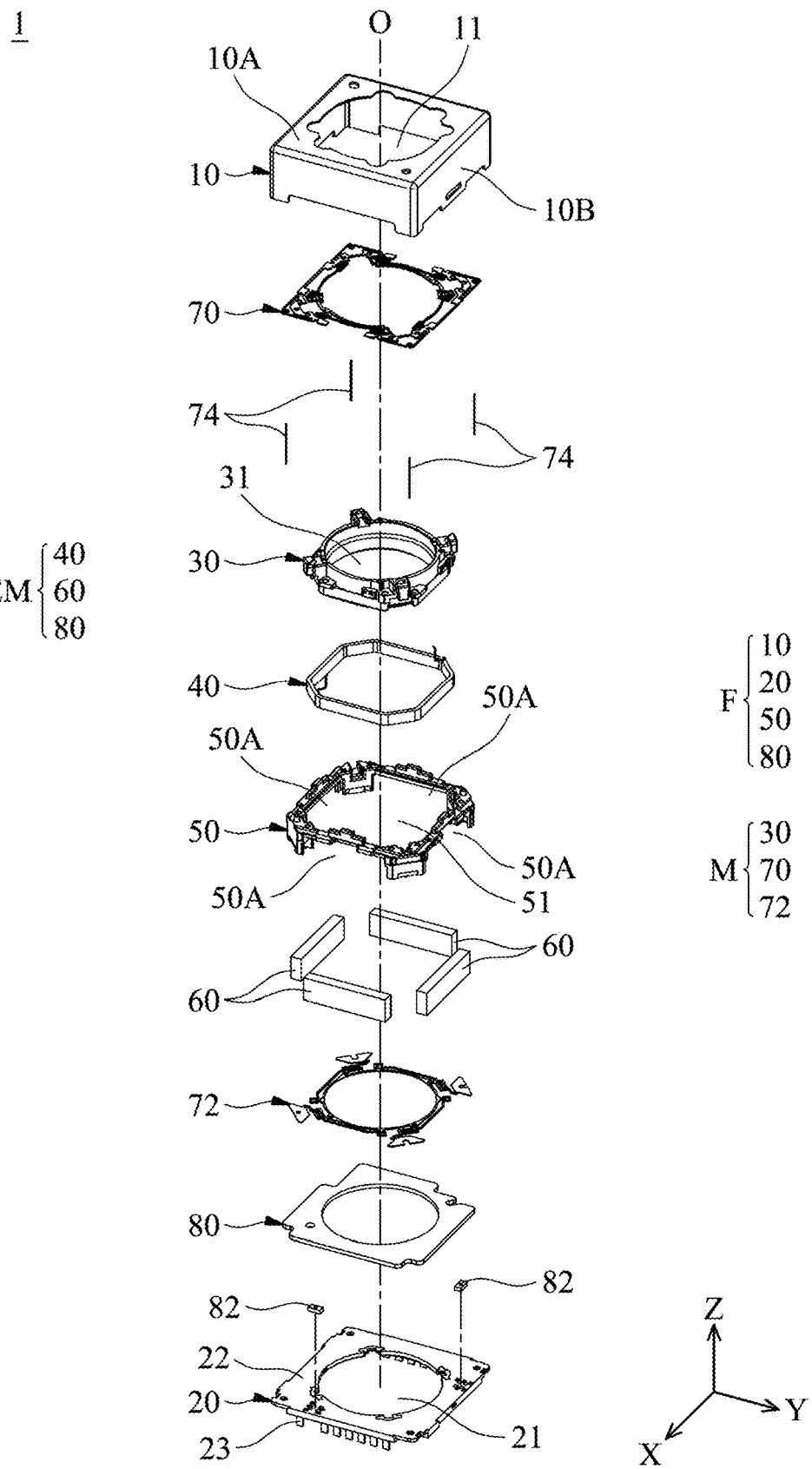
FIG. 2 is an exploded view illustrating the optical element driving mechanism shown in FIG. 1.

FIG. 2 is an exploded view illustrating the optical element driving mechanism 1 shown in FIG. 1. As shown in FIG. 2, the optical element driving mechanism 1 mainly includes a housing 10, a circuit unit 20, a carrier 30, a coil 40, a frame 50, four magnetic elements 60, a first elastic element 70, a second elastic element 72, four third elastic element 74, a circuit board 80 and two sensing elements 82. In addition, the housing 10, the circuit unit 20, the frame 50 and the circuit board 80 may constitute a fixed portion F, and the carrier 30, the first elastic element 70 and the second elastic element 72 may constitute a movable portion M.

The housing 10 has a hollow structure and has a top wall 10A and four sidewalls 10B. The housing 10 and the circuit unit 20 may be connected to each other and assembled as a hollow case. Therefore, the carrier 30, the coil 40, the frame 50, the magnetic elements 60, the first elastic element 70, the second elastic element 72, the third elastic element 74, the circuit board 80 and the sensing elements 82 may be surrounded by the housing 10, and thus may be contained in the case.

It should be noted that an opening 11 is formed on the housing 10 and another opening 21 is formed on the circuit unit 20. The center of the opening 11 corresponds to the optical axis O of the optical element (not shown). The center of the opening 21 corresponds to an image-sensing element 90 (shown in FIG. 9) that is disposed outside of the optical element driving mechanism 1. As a result, the optical element that is disposed in the optical element driving mechanism 1 may be focused with the image-sensing element 90.

The circuit unit 20 includes a plate-connecting portion 23. In the present embodiment, the plate-connecting portion 23 is made of metal or any other conductive material. The plate-connecting portion 23 is electrically connected to a driving unit (not shown) that is disposed in the optical element driving mechanism 1, and configured to perform an autofocus (AF) and optical image stabilization (OIS) function. In addition, the circuit unit 20 further includes a base 22, wherein the base 22 covers outsides of the plate-connecting portion 23 by insert molding. In other words, the plate-connecting portion 23 is at least partially embedded in the base 22. In the present embodiment, the base 22 is made of insulating material. For example, the base 22 is made of resin, but it is not limited thereto.

The carrier 30 has a hollow structure, and a through-hole 31 is formed therein, wherein the optical element is secured in the through-hole 31. The coil 40 winds around the outer peripheral surface of the carrier 30. The frame 50 has an opening 51 and four cavities 50A, wherein the cavities 50A respectively correspond to the four sidewalls 10B of the housing 10. Four magnetic elements 60 can be affixed in the four cavities 50A. In some embodiments, the four magnetic elements 60 can also be affixed in the four corners of the frame 50, and the magnetic elements 60 have a longitudinal shape.

In this embodiment, the magnetic elements 60, the coil 40, and the circuit board 80 constitute an electromagnetic driving assembly EM. It should be noted that, in some embodiments, the positions of the magnets and the coil are interchangeable. That is, in some embodiments, one or more coil may be affixed onto the frame 50, the magnets corresponding to the coil are disposed on the outer peripheral surface of the carrier 30.

Figure 3:
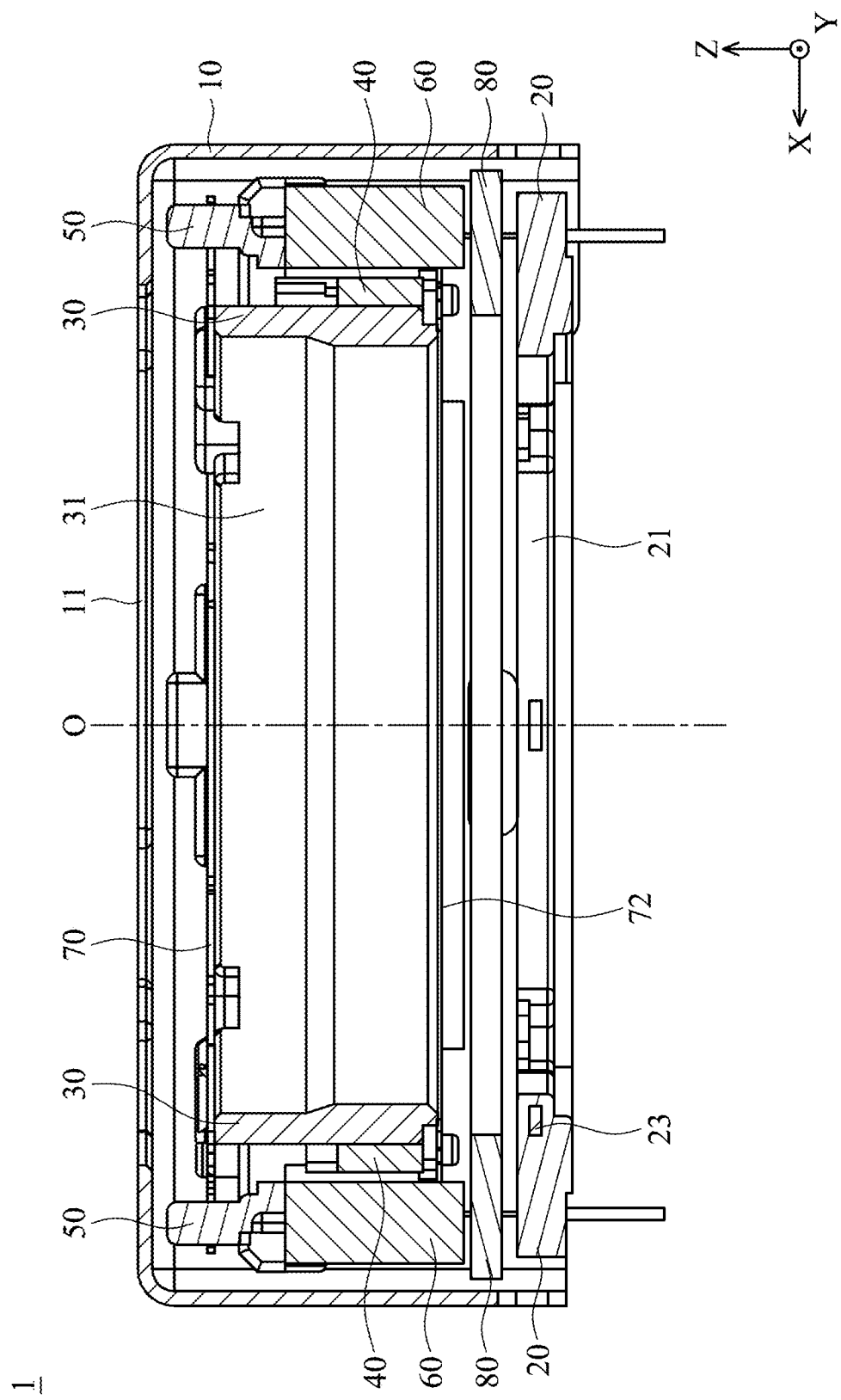
FIG. 3 is a cross-sectional view illustrating along line A-A' shown in FIG. 1.

As shown in FIG. 3, the carrier 30 and the optical element disposed therein are movably disposed in the frame 50. To be more specific, the carrier 30 may be suspended in the center of the frame 50 through the first elastic element 70 and the second elastic element 72, which are made of metal materials. When a current is applied to the coil 40, an electromagnetic force may be generated by the coil 40 and the magnetic elements 60 to drive the carrier 30 and the optical element to move along Z-axis direction relative to the frame 50.

The outer peripheral portions of the first elastic element 70 and the second elastic element 72 are connected to the upper side and the lower side of the frame 50, respectively. The inner peripheral portions of the first elastic element 70 and the second elastic element 72 are connected to the upper side and the lower side of the carrier 30. That way, the carrier 30 may be suspended in the frame 50. The circuit board 80 is, for example, a printed circuit board. Four coils (not shown) are disposed in the circuit board 80, and respectively correspond to each of the four magnetic elements 60. One end of four third elastic elements 74 is connected to the circuit unit 20, and the other end is connected to the first elastic element 70. Accordingly, the frame 50 and the carrier 30, the optical element that are disposed in the frame 50 are suspended in the housing 10, wherein the material of the third elastic elements 74 may be metal or any other suitable conductive material.

It should be understood that electric signals may be transmitted to the coil 40 and the coils in the circuit board 80 via the plate-connecting portion 23. In addition, the electric signals may also be transmitted from the plate-connecting portion 23 to the coil 40 via the third elastic elements 74 and the first elastic element 70. Therefore, the movement of the carrier 30 in the X-axis, Y-axis and Z-axis may be controlled.

As shown in FIG. 2, the sensing elements 82, which are electrically connected to the plate-connecting portion 23, are respectively mounted on different sides of the circuit unit 20. The sensing elements 82 are, for example, Hall effect sensors, magnetoresistive (MR) sensors, or fluxgates, and thereby the sensing elements 82 may be configured to detect the magnetic elements 60 on the frame 50 to obtain the displacement of the frame 50 and the holder 30 relative to the circuit unit 20 in the X-axis and Y-axis directions. For instance, after the base 22 is formed on and covers the outsides of the plate-connecting portion 23 by insert molding, the sensing elements 82 may be electrically connected (such as by welding) to the plate-connecting portion 23. In an embodiment, the sensing elements 82 may also be electrically connected (such as by welding) to the plate-connecting portion 23 before the plastic material 22 is formed on and covers the outsides of the plate-connecting portion 23 by insert molding.

It should be noted that the plate-connecting portion 23 may generate and provide electrical signals to the coils in the circuit board 80, and an electromagnetic driving force is generated between the coils and the magnetic elements 60 to drive the frame 50 to move along a direction (parallel to the X-Y plane) which is perpendicular to the optical axis O. The displacement is compensated for so that the OIS function is achieved.

Figure 4:
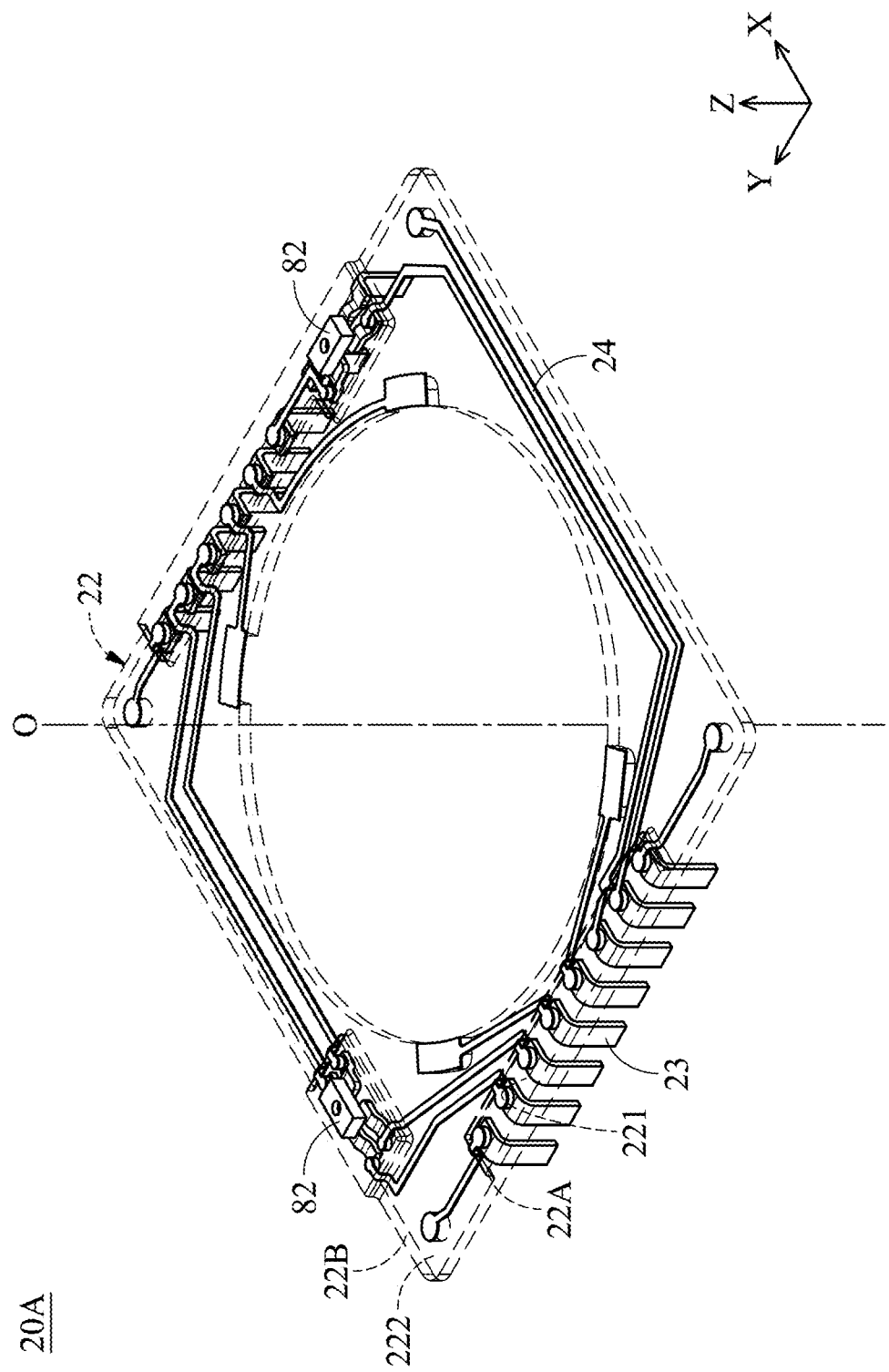
FIG. 4 is a perspective view illustrating a circuit unit in accordance with another embodiment of the present disclosure.

FIG. 4 is a perspective view illustrating a circuit unit 20A in accordance with another embodiment of the present disclosure. In the present embodiments, the circuit unit 20A includes a base 22, a plate-connecting portion 23 and a layer-connecting portion 24. It should be noted that the base 22 is illustrated as dotted lines in order to clearly show the interior structure of the circuit unit 20A. The base 22 includes a first portion 22A and a second portion 22B. The thickness of the first portion 22A in the Z axis may be greater than the thickness of the second portion 22B in the Z axis. The first portion 22A has a first surface 221, and the second portion 22B has a second surface 222. The first surface 221 is a top surface of the first portion 22A, and the second surface 222 is a top surface of the second portion 22B. In other words, the first surface 221 and the second surface 222 may be located on planes at different heights. In the present embodiment, the first surface 221 and the second surface 222 are located on different horizontal planes (the X-Y planes). In other embodiments, the first surface 221 and the second surface 222 may be non-horizontal planes. In the present embodiment, the plate-connecting portion 23 and the layer-connecting portion 24 are made of metal or any other suitable conductive material.

As shown in FIG. 4, the plate-connecting portion 23 is partially embedded in the first portion 22A of the base 22, and extends downwards along a vertical direction (the Z axis) and out of the optical element driving mechanism 1. The layer-connecting portion 24 is disposed on the surface of the base 22 (i.e. disposed on the first surface 221 and the second surface 222). In the present embodiment, the plate-connecting portion 23 and the layer-connecting portion 24 may be electrically connected to the electromagnetic driving assembly EM (shown in FIG. 2), and thereby external electric signals may be transmitted to the electromagnetic driving assembly EM to control the operation of the electromagnetic driving assembly EM. The plate-connecting portion 23 may serve as pins of the circuit unit 20A and be electrically connected to an external component. The layer-connecting portion 24 may transmit electric signals between the plate-connecting portion 23 and the electromagnetic driving assembly EM.

Since the layer-connecting portion 24 may be disposed without insert molding, the base 22 would not cover the layer-connecting portion 24, making the base 22 thinner in the Z axis and achieving the miniaturization. In addition, the thickness of the layer-connecting portion 24 may be less than the thickness of the plate-connecting portion 23 due to different forming methods. The sensing elements 82 may be disposed on the first portion 22A and electrically connected to the plate-connecting portion 23 and the layer-connecting portion 24. It should be appreciated that an integrated circuit (IC) component or electric component (such as a capacitor) may also be disposed on the first portion 22A, and electrically connected to the plate-connecting portion 23 and the layer-connecting portion 24.

Figure 5:
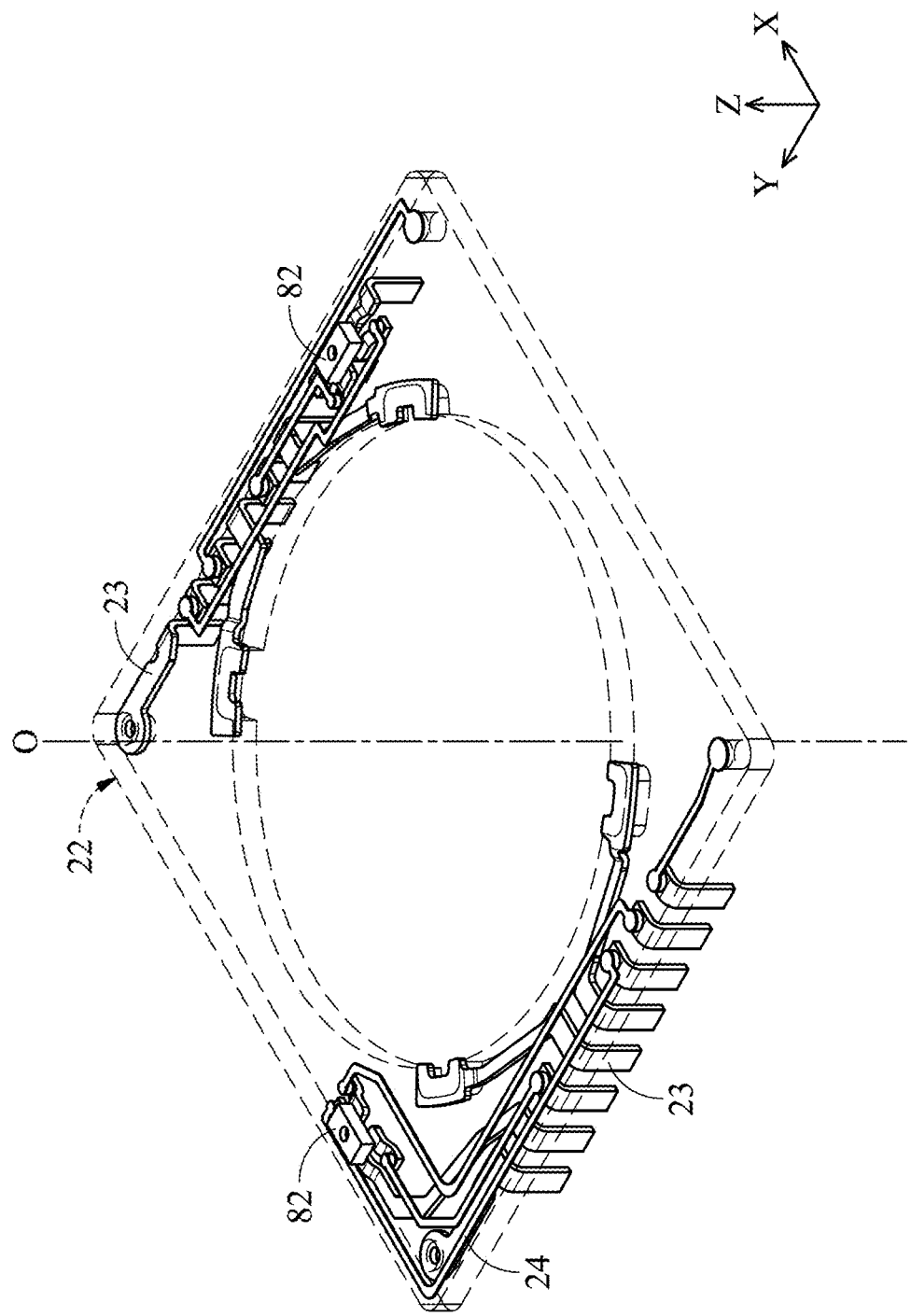
FIG. 5 is a perspective view illustrating the circuit unit in accordance with another embodiment of the present disclosure.

FIG. 5 is a perspective view illustrating the circuit unit 20B in accordance with another embodiment of the present disclosure. It is noted that the difference between the circuit unit 20B shown in the present embodiment and the circuit unit 20A shown in FIG. 4 is that the thickness of the whole base 22 is uniform. In addition, electric signals may be transmitted to the electromagnetic driving assembly EM via the plate-connecting portion 23 inside the base 22. Accordingly, the diversity of circuit design may be increased.

Figure 6:
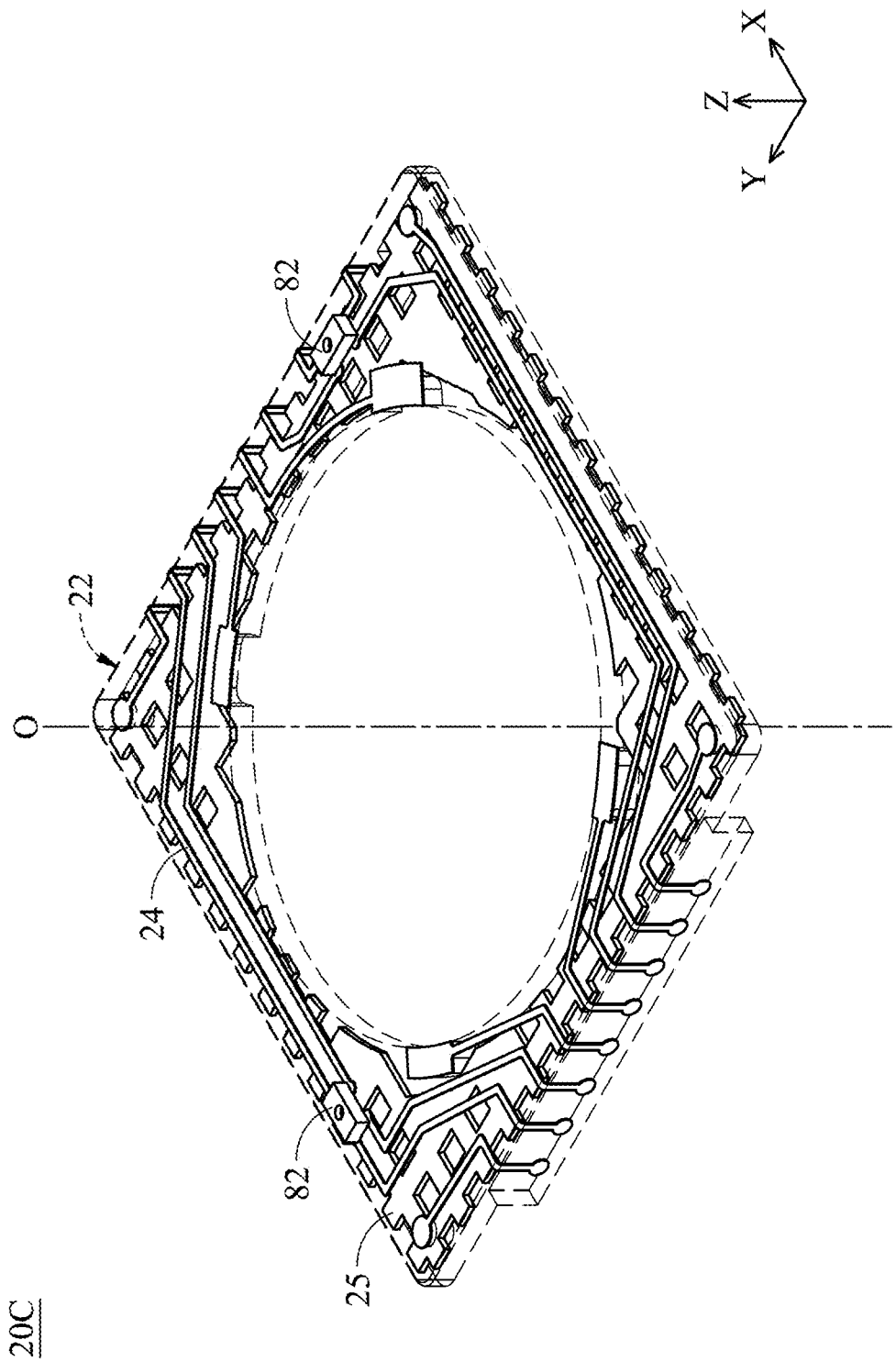
FIG. 6 is a perspective view illustrating the circuit unit in accordance with another embodiment of the present disclosure.

FIG. 6 is a perspective view illustrating the circuit unit 20C in accordance with another embodiment of the present disclosure. It is noted that the difference between the circuit unit 20C shown in the present embodiment and the circuit unit 20B shown in FIG. 5 is that the circuit unit 20C includes a plate-connecting portion 25 that is completely embedded in the base 22. The plate-connecting portion 25 may extend across the base 22 instead of being disposed in a small region of the base 22. In the present embodiment, the plate-connecting portion 25 is made of metallic material. The arrangement of the plate-connecting portion 25 may enhance the mechanical strength and reliability of the circuit unit 20C. Furthermore, in the present embodiment, the layer-connecting portion 24 is electrically isolated from the plate-connecting portion 25. That is, the plate-connecting portion 25 is not configured to transmit electric signals. The layer-connecting portion 24 may transmit electric signals between the electromagnetic driving assembly EM and the external component, so that the optical element driving mechanism 1 may drive the optical element to move.

Figure 7:
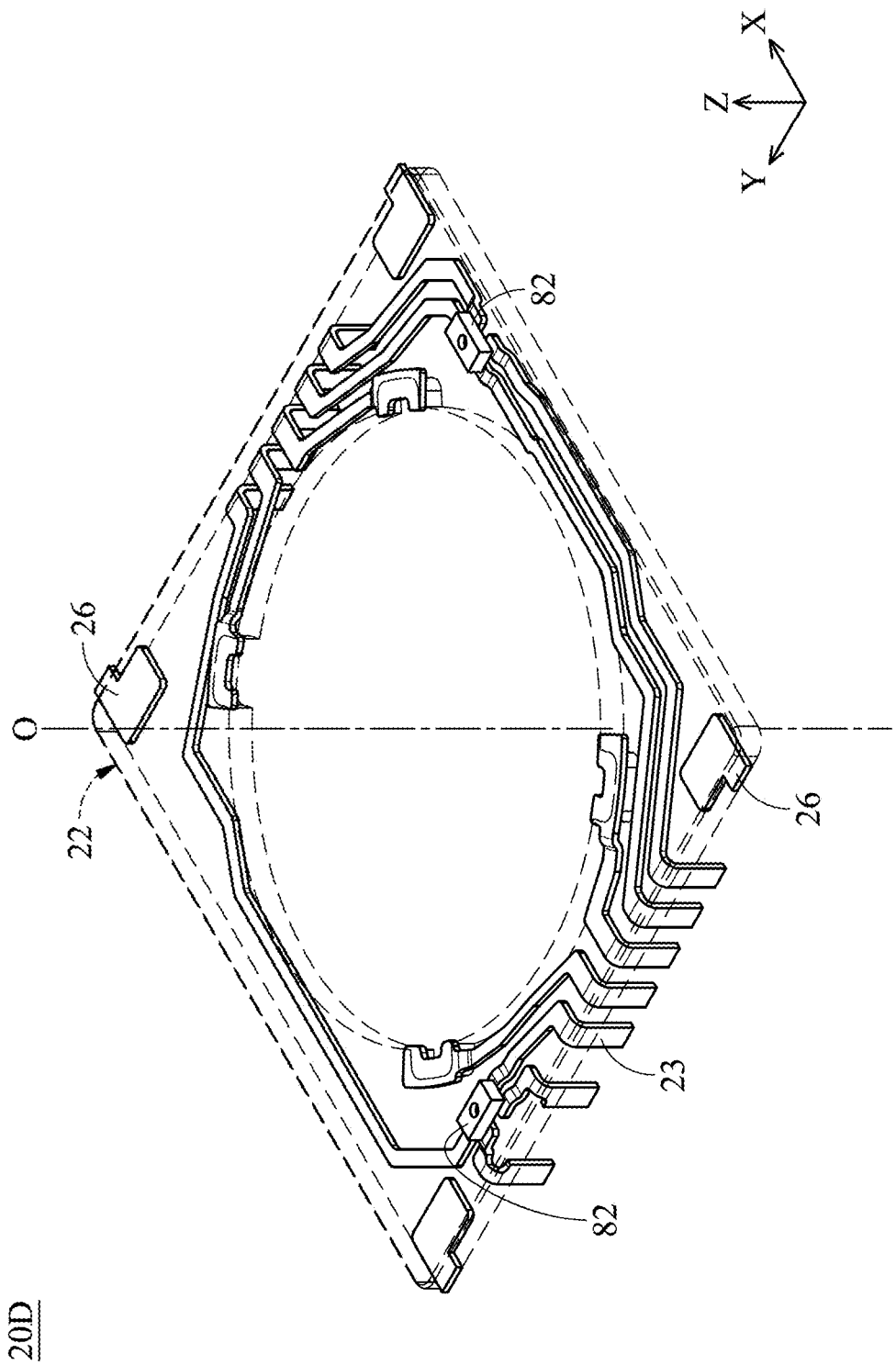
FIG. 7 is a perspective view illustrating the circuit unit in accordance with another embodiment of the present disclosure.

FIG. 7 is a perspective view illustrating the circuit unit 20D in accordance with another embodiment of the present disclosure. It is noted that the difference between the circuit unit 20D shown in the present embodiment and the circuit unit 20B shown in FIG. 5 is that the circuit unit 20D includes plate-connecting portions 23 and 26 which are electrically isolated from each other, and both are embedded in the base 22. The plate-connecting portion 23 is configured to transmit electric signals between the electromagnetic driving assembly EM and the external component. The plate-connecting portion 26 extends outside of the side surface of the base 22 along the horizontal direction. The plate-connecting portion 26 may be affixed to the housing 10 by welding, soldering or any other suitable process. The connection between the plate-connecting portion 26, which protrudes from the base 22, and the housing 10 (or other components) may enhance the mechanical strength and reliability of the optical element driving mechanism 1.

Figure 8:
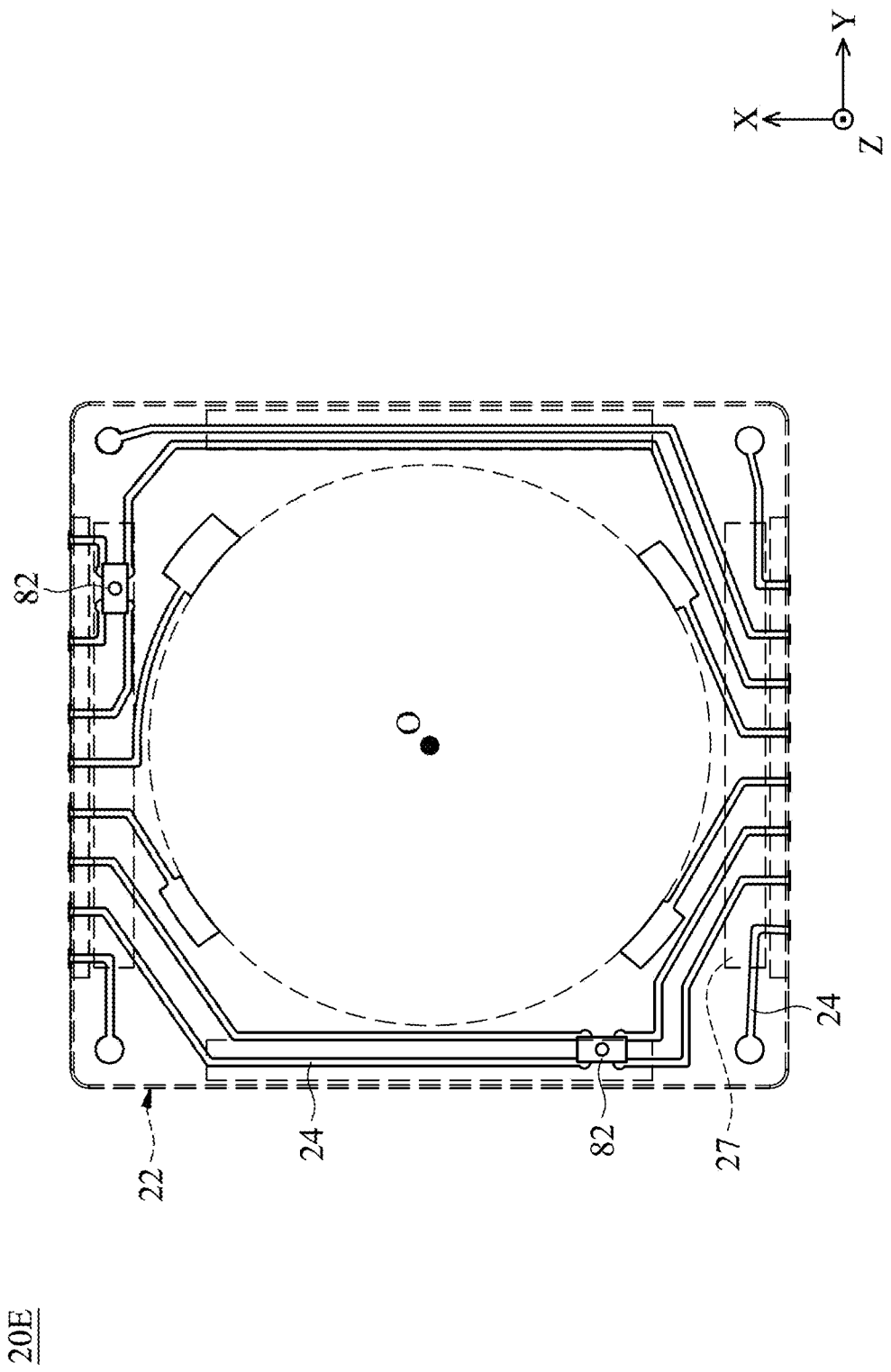
FIG. 8 is a top view illustrating the circuit unit in accordance with another embodiment of the present disclosure.

FIG. 8 is a top view illustrating the circuit unit 20E in accordance with another embodiment of the present disclosure. It is noted that the difference between the circuit unit 20E shown in the present embodiment and the circuit unit 20C shown in FIG. 6 is that the circuit unit 20E includes a plate-connecting portion 27 that is completely embedded in the base 22. The plate-connecting portion 27 is disposed at a position corresponding to the magnetic elements 60 (shown in FIG. 2). Namely, when viewed in the vertical direction (the Z axis), the plate-connecting portion 27 and the magnetic elements 60 substantially overlap. In the present embodiment, the plate-connecting portion 27 may be made of a magnetic-permeable material, or a magnetic-permeable material layer is coated on the surface of the plate-connecting portion 27. Therefore, the magnetic field generated by the magnetic elements 60 may be concentrated. In addition, the layer-connecting portion 24 is electrically isolated from the plate-connecting portion 27. The layer-connecting portion 24 may transmit electric signals between the electromagnetic driving assembly EM and the external component, so that the optical element driving mechanism 1 may drive the optical element to move.

Figure 9:
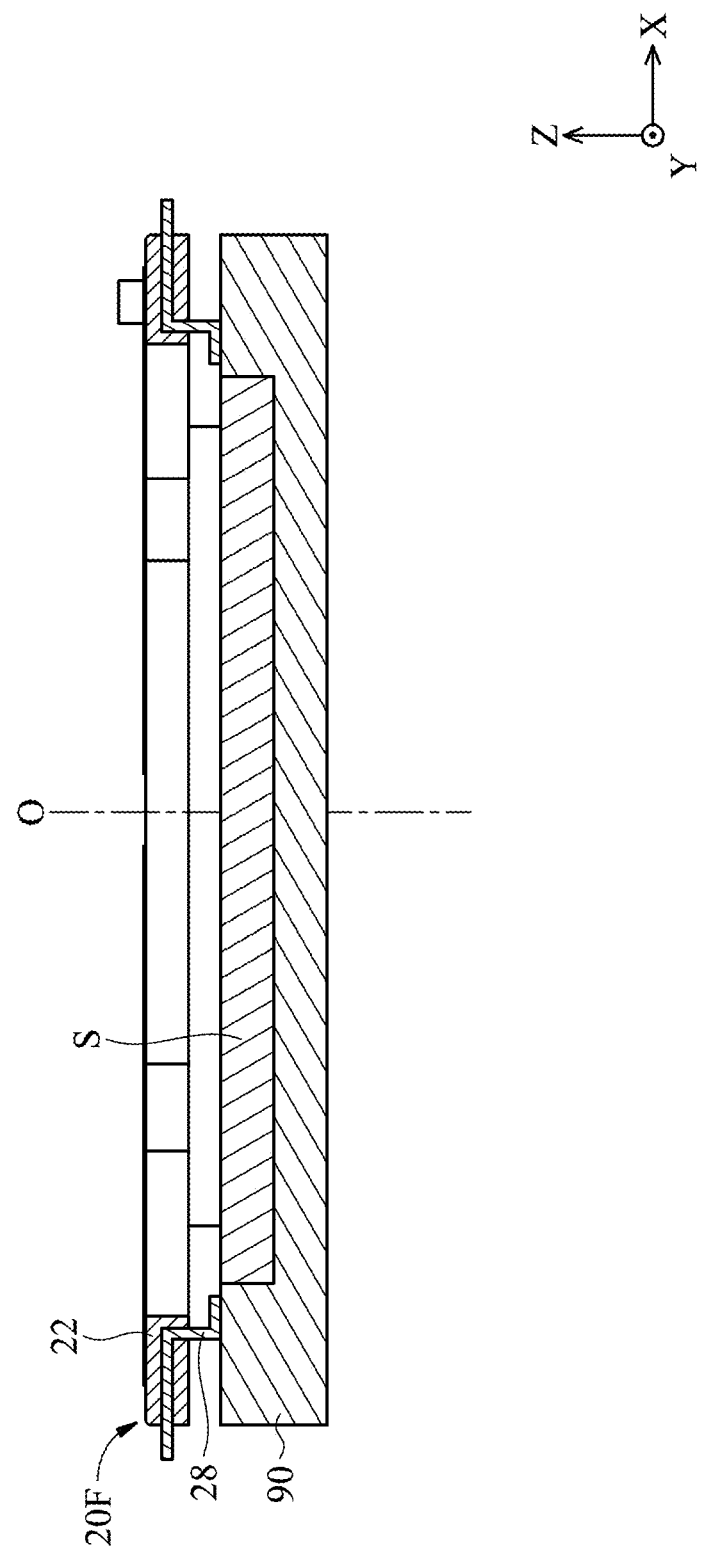
FIG. 9 is a cross-sectional view illustrating the circuit unit and an image-sensing element in accordance with another embodiment of the present disclosure.

FIG. 9 is a cross-sectional view illustrating the circuit unit 20F and the image-sensing element 90 in accordance with another embodiment of the present disclosure. As shown in FIG. the image-sensing element 90 is disposed below the circuit unit 20F. The image-sensing element 90 includes a sensing region S that is configured to detect light passing through the optical element disposed in the optical element driving mechanism 1, and the light may be converted to an image. In the present embodiment, the circuit 20F includes a base 22 and a plate-connecting portion 28, wherein the plate-connecting portion 28 is partially embedded in the base 22 and extends outside of the base. One end of the plate-connecting portion 28 abuts the image-sensing element 90, and the other end may abut other components (not shown). Since a certain amount of heat may be generated during the operation of the image-sensing element 90, the high thermal conductivity of the plate-connecting portion 28 may rapidly remove the heat from the image-sensing element 90. In addition, when viewed in the vertical direction (the Z axis), the plate-connecting portion 28 does not overlap the sensing region S of the image-sensing element 90 in order to avoid any interference during image detection.

It should be noted that the circuit units discussed in the above embodiments merely serve as examples. In other embodiments of the present disclosure, metallic circuit (i.e. the layer-connecting portion 24 and/or the plate-connecting portion 23) may also be disposed in any other component where the metallic circuit may be embedded. For example, the metallic circuit may be embedded in the housing 10, the frame 50 or the carrier 30 shown in FIG. 2 in order to achieve miniaturization of the optical element driving mechanism.

As set forth above, the embodiments of the present disclosure provide an optical element driving mechanism including a circuit unit that has a plate-connecting portion and a layer-connecting portion, wherein the plate-connecting portion and the layer-connecting portion have different thicknesses. The arrangement of the plate-connecting portion and the layer-connecting portion may effectively reduce the thickness of the circuit unit, achieving the miniaturization of the optical element driving mechanism. In addition, the position of the plate-connecting portion may be adjusted as required in order to enhance mechanical strength, optimize magnetic field and enhance thermal-dissipation.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical element driving mechanism, comprising:
   a fixed portion;
   a movable portion, movably connected to the fixed portion, and carrying an optical element;
   a driving assembly for driving the movable portion to move relative to the fixed portion; and
   a circuit unit, comprising:
      a base, wherein the base has a first surface and a second surface, and the first surface and the second surface are located on different planes;
      a plate-connecting portion partially embedded in the base; and
      a layer-connecting portion disposed on the first surface and the second surface, wherein the driving assembly is electrically connected to the layer-connecting portion, and the thickness of the plate-connecting portion is different from the thickness of the layer-connecting portion.

2. The optical element driving mechanism as claimed in claim 1, wherein the driving assembly is electrically connected to the plate-connecting portion.

3. The optical element driving mechanism as claimed in claim 1, further comprising an electric component, wherein the plate-connecting portion is electrically connected to the electric component.

4. The optical element driving mechanism as claimed in claim 1, wherein the driving assembly further comprises a magnetic element, and the magnetic element overlaps the plate-connecting portion.

5. The optical element driving mechanism as claimed in claim 1, wherein the plate-connecting portion is completely embedded in the base.

6. The optical element driving mechanism as claimed in claim 1, further comprising a circuit board disposed on the circuit unit, wherein the circuit board is electrically connected to the circuit unit.

7. The optical element driving mechanism as claimed in claim 1, further comprising a metallic circuit embedded in the movable portion.

8. An optical element driving mechanism, comprising:
   a fixed portion;
   a movable portion, movably connected to the fixed portion, and carrying an optical element;
   a driving assembly for driving the movable portion to move relative to the fixed portion; and
   a circuit unit, comprising:
      a base, wherein the base has a first portion and a second portion, and the thickness of the first portion is greater than the thickness of the second portion;
      a plate-connecting portion partially embedded in the base, wherein the plate-connecting portion is disposed in the first portion; and
      a layer-connecting portion disposed on the base, wherein the driving assembly is electrically connected to the layer-connecting portion, and the thickness of the plate-connecting portion is different from the thickness of the layer-connecting portion.

9. The optical element driving mechanism as claimed in claim 8, further comprising a sensing element for detecting the movement of the movable portion relative to the fixed portion, wherein the sensing element is disposed on the first portion.

10. An optical element driving mechanism, comprising:
    a fixed portion;
    a movable portion, movably connected to the fixed portion, and carrying an optical element;
    a driving assembly for driving the movable portion to move relative to the fixed portion; and
    a circuit unit, comprising:
       a base;

a plate-connecting portion partially embedded in the base; and a layer-connecting portion disposed on the base, wherein the driving assembly is electrically connected to the layer-connecting portion, and the thickness of the plate-connecting portion is different from the thickness of the layer-connecting portion, wherein the plate-connecting portion is electrically isolated from the layer-connecting portion.

11. The optical element driving mechanism as claimed in claim 10, wherein the fixed portion further comprises a housing, and the plate-connecting portion is affixed to the housing.

12. An optical element driving mechanism, comprising:
a fixed portion;
a movable portion, movably connected to the fixed portion, and carrying an optical element;
a driving assembly for driving the movable portion to move relative to the fixed portion; and
a circuit unit, comprising:
  a base;
  a plate-connecting portion partially embedded in the base, wherein the plate-connecting portion is partially exposed from the base and extends out of the base; and
  a layer-connecting portion disposed on the base, wherein the driving assembly is electrically connected to the layer-connecting portion, and the thickness of the plate-connecting portion is different from the thickness of the layer-connecting portion.

13. The optical element driving mechanism as claimed in claim 12, further comprising a sensing element for detecting the movement of the movable portion relative to the fixed portion, wherein the sensing element is disposed on one side of the base, and the plate-connecting portion is exposed on another side of the base.

14. The optical element driving mechanism as claimed in claim 12, further comprising a sensing element for detecting the movement of the movable portion relative to the fixed portion, wherein the sensing element is disposed on one side of the base, and the plate-connecting portion is exposed on the same side of the base.

15. An optical element driving mechanism, comprising:
a fixed portion;
a movable portion, movably connected to the fixed portion, and carrying an optical element;
a driving assembly for driving the movable portion to move relative to the fixed portion; and
a circuit unit, comprising:
  a base;
  a plurality of plate-connecting portions partially embedded in the base, wherein the plate-connecting portions are electrically isolated from each other; and
  a layer-connecting portion disposed on the base, wherein the driving assembly is electrically connected to the layer-connecting portion, and the thickness of the plate-connecting portion is different from the thickness of the layer-connecting portion.

16. The optical element driving mechanism as claimed in claim 15, wherein the plate-connecting portions extend out of the base in different directions, and the directions are substantially perpendicular to each other.

17. An optical element driving mechanism, comprising:
a fixed portion;
a movable portion, movably connected to the fixed portion, and carrying an optical element;
a driving assembly for driving the movable portion to move relative to the fixed portion; and
a circuit unit, comprising:
  a base;
  a plate-connecting portion partially embedded in the base, wherein the driving assembly is electrically isolated from the plate-connecting portion; and
  a layer-connecting portion disposed on the base, wherein the driving assembly is electrically connected to the layer-connecting portion, and the thickness of the plate-connecting portion is different from the thickness of the layer-connecting portion.

18. An optical element driving mechanism, comprising:
a fixed portion;
a movable portion, movably connected to the fixed portion, and carrying an optical element, wherein the movable portion comprises a carrier and an elastic element, the carrier is movably connected to the fixed portion via the elastic element;
a driving assembly for driving the movable portion to move relative to the fixed portion; and
a circuit unit, electrically connected to the driving assembly via the elastic element, comprising:
  a base;
  a plate-connecting portion partially embedded in the base; and
  a layer-connecting portion disposed on the base, wherein the driving assembly is electrically connected to the layer-connecting portion, and the thickness of the plate-connecting portion is different from the thickness of the layer-connecting portion.

19. An optical element driving mechanism, comprising:
a fixed portion;
a movable portion, movably connected to the fixed portion, and carrying an optical element;
a driving assembly for driving the movable portion to move relative to the fixed portion; and
a circuit unit, comprising:
  a base;
  a plate-connecting portion partially embedded in the base, wherein the plate-connecting portion abuts an image-sensing element, and the image-sensing element detects light passing through the optical element; and
  a layer-connecting portion disposed on the base, wherein the driving assembly is electrically connected to the layer-connecting portion, and the thickness of the plate-connecting portion is different from the thickness of the layer-connecting portion.

* * * * *